United States Patent [19]

Bailey et al.

[11] Patent Number: 4,738,615

[45] Date of Patent: Apr. 19, 1988

[54] THERMAL RECLAMATION OF INDUSTRIAL SAND

[75] Inventors: Ian A. Bailey, Huncote; David J. Bradshaw, Cosby, both of England

[73] Assignee: Richards Structural Steel Co. Limited, Leicester, England

[21] Appl. No.: 860,116

[22] Filed: May 6, 1986

[30] Foreign Application Priority Data

May 8, 1985 [GB] United Kingdom ............... 8511622

[51] Int. Cl.⁴ .................. F27B 15/00; F26B 3/08
[52] U.S. Cl. .................. 432/15; 432/58; 432/95; 110/245
[58] Field of Search ............... 432/15, 58, 95; 110/245

[56] References Cited

U.S. PATENT DOCUMENTS

| | | | |
|---|---|---|---|
| 2,819,890 | 1/1958 | Rosa et al. | 432/58 |
| 3,117,064 | 1/1964 | Friedrich | 432/58 |
| 3,299,947 | 1/1967 | Boucraut et al. | 432/58 |
| 3,993,546 | 11/1976 | Nazinin et al. | 432/95 |
| 4,052,140 | 10/1977 | Highley | 432/58 |
| 4,135,767 | 1/1979 | Hench et al. | 432/58 |
| 4,249,889 | 2/1981 | Kemp | 432/58 |
| 4,333,909 | 6/1982 | Stewart et al. | 110/347 |
| 4,492,040 | 1/1985 | Jensen et al. | 34/10 |
| 4,517,162 | 5/1985 | Moss | 432/58 |
| 4,616,426 | 10/1986 | Large | 432/58 |
| 4,626,199 | 12/1986 | Boumini | 432/58 |

*Primary Examiner*—Henry C. Yuen
*Attorney, Agent, or Firm*—Charles E. Brown; Charles A. Brown

[57] ABSTRACT

The invention relates to a method of reclaiming contaminated industrial sand including the steps of subjecting the sand to the influence of heat in a fluidizing bed, forcing sand fed to said bed to follow a flow path including a plurality of generally heightwise directed path portions including at least one generally upwardly directed path portion and at least one generally downwardly directed path portion. In an example of the invention, the heat is applied to the sand in a first group of path portions and the sand is cooled in a second group of path portions.

9 Claims, 3 Drawing Sheets

THERMAL RECLAMATION OF INDUSTRIAL SAND

The invention relates to improvements in or relating to the thermal reclamation of industrial sand.

The viability of many industrial uses of sand depends on the extent to which reclaimed sand can be re-circulated to the process, such as a foundry moulding process, in a clean condition. For example, greensand which includes coal dust and clay may be calcined, or sand contaminated with organic moulding resin may be reclaimed by so-called thermal reclamation processes which involve subjecting the contaminated sand to a heating step subsequent cooling to a handling temperature. It is known to heat the sand in a fluidising apparatus but hitherto only a qualified success has been achieved due mainly to unacceptably high heat-to-air losses and poor heat exchange efficiency. Problems encountered include the formation of hot-spots, the spontaneous by-passing of the fluidised zones by large quantities of sand, and the carrying-off of a high proportion of heat by the lost air and the fouling of porous tiles and bubble caps when attempting to recycle flue gas, due to high dust content.

The present invention provides a method for the thermal reclamation of contaminated industrial sand including the steps of subjecting the sand to the influence of heat in a fluidising bed, forcing sand fed to said bed to follow a flow path including a plurality of generally heightwise directed path portions, said plurality including at least one generally upwardly directed path portion and at least one generally downwardly directed path portion.

Preferably, a second group of path portions comprise a plurality of passageways through which the sand passes in a fluidised condition, cooling air being directed around the passageways in a heat exchange arrangement. Conveniently, heated air from the second group of path portions is fed to the fluidising bed comprising the first group of path portions.

In examples of apparatus in which the method described above may be carried out, the path of the sand may comprise at least one generally upwardly directed path portion with at least one generally downwardly directed portion arranged to provide a serpentine flow path.

Advantageously, said path portions comprise a plurality of passageways through which the sand passes in a fluidised condition, air being directed around the passageways in a heat exchange arrangement.

The invention further provides apparatus for carrying out the method of the third paragraph of the specification comprising a first fluidising zone comprising a chamber, a sand inlet at one end of said chamber, at least one transverse weir upstanding from a base panel of said chamber and at least one transverse baffle plate arranged to extend from a level above the normal level of fluidised material in said chamber downwardly to a level spaced from said base panel and arranged in said path so as to define a path portion between the or one weir and the or one adjacent baffle, said apparatus further comprising a second fluidising zone, means to supply cooling air to reduce by heat exchange the temperature of sand entering said second zone and means to transfer air so heated to said first zone as fluidising air.

Advantageously, heating means may be arranged in the sand flow path of the first fluidising zone. Alternatively, if desired, external gaseous fuel burners may be used to heat the fluidising air prior to entry into the zone.

In examples of apparatus according to the invention, the heating means of the first zone may comprise a plurality of elongate heaters arranged to extend transversely of the chamber in a staggered formation to enhance contact between the heaters and the sand. Advantageously, the second zone comprises a plurality of passageways defining the second group of path portions, said passageways comprising tubular conduits.

It will be appreciated that the heat exchange characteristics of the second zone are enhanced by the use of said tubular conduits. Very effective heat transfer is obtained since there is a minimal pressure drop across a chamber in which the fluidised material passes through relatively wide bore tubular conduits with an air flow external to these, compared with a conventional situation in which the cooling is achieved by air passing through small bore tubes around which the sand is caused to flow. A considerably increased pressure differential is required to force air through narrow tubes than through narrow gaps between adjacent tubular conduits.

Further aspects of the invention will become apparent from the following detailed description of an example of an apparatus for carrying out the method of the invention. It will be understood that the description which is to be read with reference to the drawings is given by way of example and not by way of limitation.

The apparatus illustrated in the Figures is suitable for the thermal reclamation of foundry sand contaminated by resin or to calcine greensand. Sand is reclaimed by heating to temperatures up to about 600° C. to reduce the resin content to an acceptable level to up to about 780° C. for calcining greensand. In the case of greensand a further step of grain scrubbing will follow calcination. The clean sand may then be returned to the foundry for re-use in casting boxes or core-making.

The apparatus comprises two zones, zone A in which the sand is heated while in a fluidised condition and zone B in which the sand, still in a fluidised condition, is cooled to a handling temperature.

Figure 1:
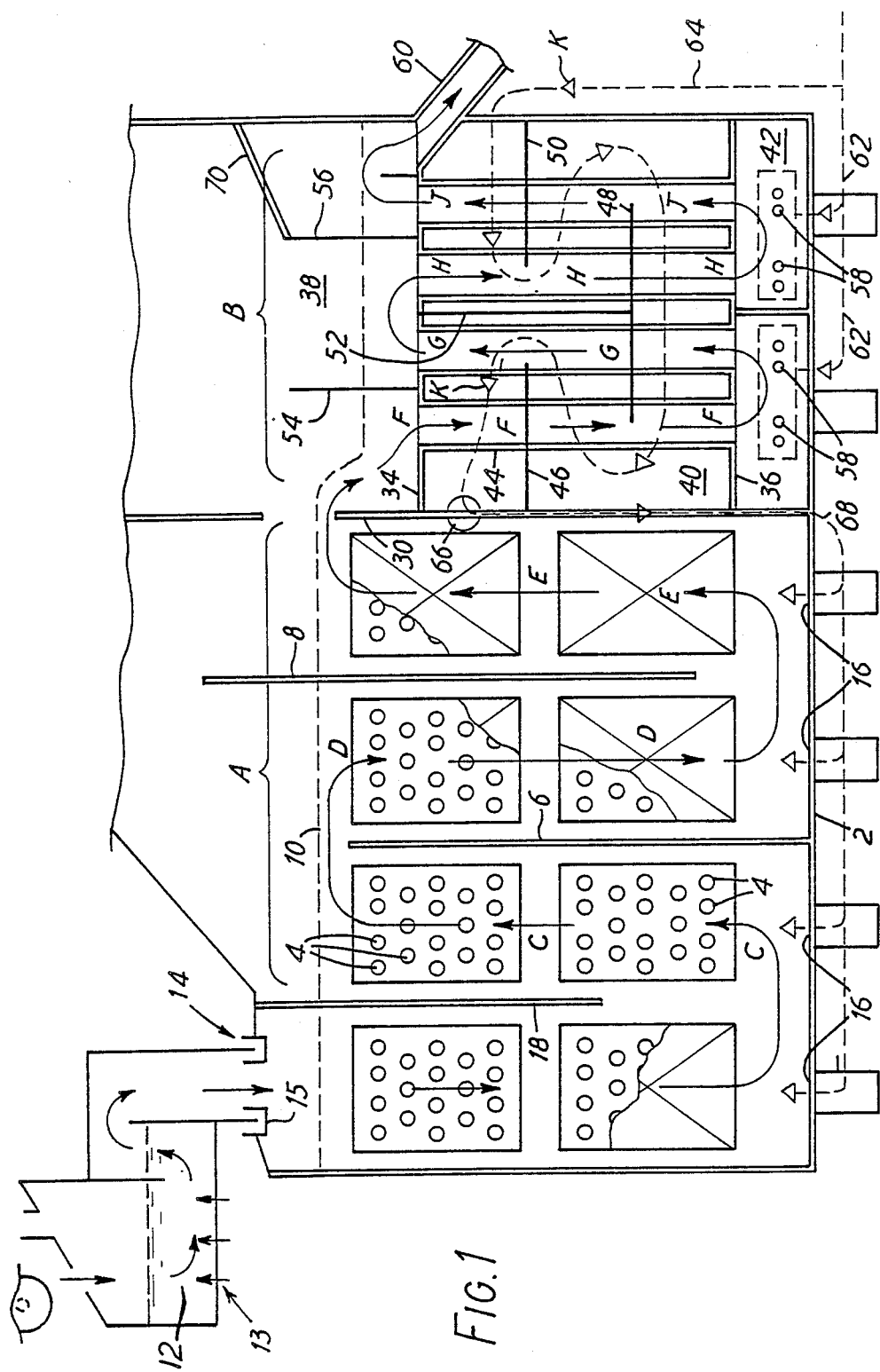
FIG. 1 is a diagrammatic side elevational view of apparatus of the invention, having a side wall thereof removed for clarity of view of the two zones thereof.
Figure 2:
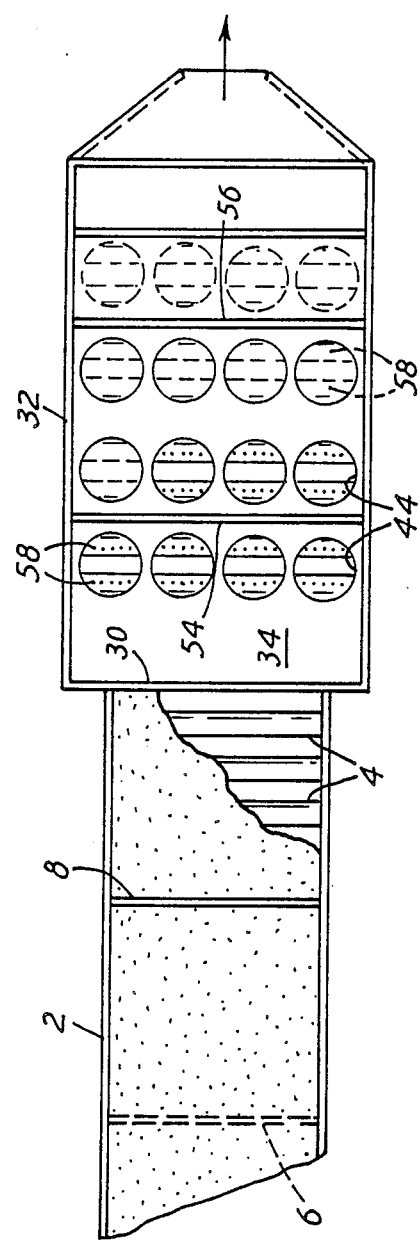
FIG. 2 is a diagrammatic plan view of the apparatus of FIG. 1.
Figure 4:
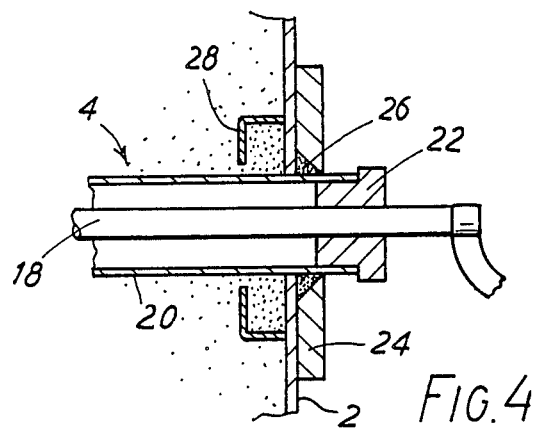
FIG. 4 shows a mounting arrangement for a heating device of the first zone of the apparatus.

The zone A comprises a chamber 2 containing a plurality, in the present example eight, of banks of electrical heating devices 4, the detailed construction of which is described later with reference to FIG. 4. Each bank of heating devices 4 is mounted for easy removal from the chamber for repair and replacement. The heating devices are elongate and extend transversely of the chamber 2 as may be seen from FIG. 2 and are in a staggered arrangement of rows within each bank in order to enhance contact with the flow of fluidised sand. In certain circumstances, the first bank of heating devices 4, i.e. at the left hand side as viewed in FIG. 1 may be dispensed with.

A weir 6 extends transversely of the chamber 2 and is upstanding between the heating devices from a floor panel of the chamber to a level sufficient to prevent the sand flowing in a horizontal path across the floor panel, that is, in the present example, to a level at approximately the upper surface of the top banks of heating devices.

A baffle 8 is arranged to extend from a level above that of the heating devices 4 downwardly between the banks of devices 4 to a level spaced from the floor panel of chamber 2. Sand is present in a fluidised condition up to a level 10 in the chamber 2. Contaminated sand is fed in a metered fashion from a hopper or other dispenser (not shown) through a fluidised sand seal 12 to an inlet 14 of the chamber 2. The sand in this seal will be static during heat-up of the apparatus to minimise heat loss but will be fluidised by air entering at 13 during normal operation. The inlet 14 is sealed with the chamber by a expandible joint comprising a continuous sand trap 15.

The sand entering the chamber may be at about 25° C., or if promptly treated after the previous casting process may be at a higher temperature. The sand is then subject to the effect of fluidising air supplied to the chamber 2 at inlets 16. A baffle 18 ensures that the sand descends in the inlet so as thereafter to commence an upward flow path portion indicated by arrows C. Because of the staggered arrangement of the heating devices 4, the sand particles are forced around the individual heating devices 4 (see small arrows C') to enhance the transfer of heat.

The sand which rises to the level 10 in the chamber passes over the weir 6 and then descends in the direction of arrows D, passes under the baffle 8 and rises towards the level 10 (arrows E).

By the time the sand has reached the level 10 again after passing under the baffle 8, its temperature has been raised to approximately 600° C., or 780° C. in the case of greensand, principally by the heating devices 4, partly by the action of the heated fluidising air entering at 16, and, where appropriate, by the calorific value of the residual resin.

It will be observed that the sand has been forced to follow a serpentine path through zone A and therefore use of the apparatus results in a guaranteed minimum retention time for the sand being heated.

In the present example, the heating devices each comprise a silicon carbide element 18 received within a relatively wide nickel-chromium alloy tube 20, of sufficient diameter to reduce the risk of hot-spots forming, the elements being secured at each end of the tube (only one end shown in FIG. 4) by an end cap 22. The tube 20 is received in an aperture in the wall of chamber 2 passing through a washer 24 having an inner bevelled surface trapping ceramic packing material at 26 to facilitate differential expansion of the tubes. On the interior surface of the chamber wall 2 is a baffle seal 28 which creates a seal of static sand entrapped so as to prevent movement of the fluidised sand causing wear or leakage problems. Heating devices constructed and mounted in this way may be operated at a temperature of 950° C. for long periods of time, and are readily replaceable when required without the need to cool or remove sand. However, as already mentioned, other heating means may be employed if desired.

Figure 3:
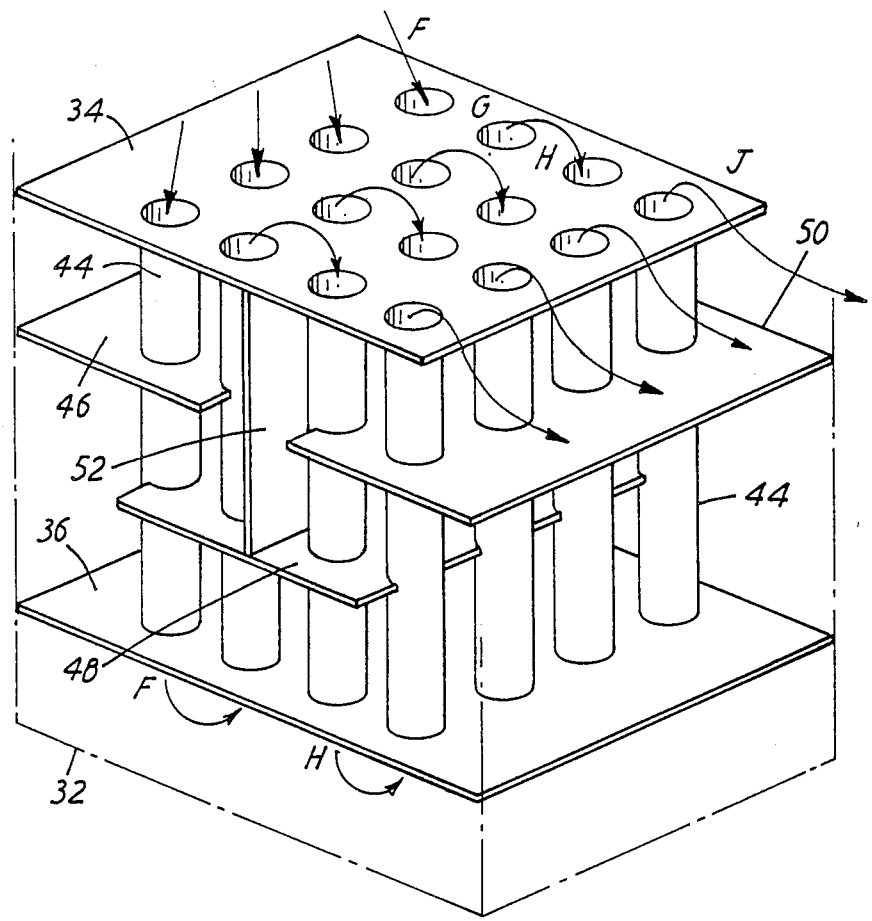
FIG. 3 is a perspective view of the tubular passageways of the second zone of the apparatus.

Sand, which as explained above is by now heated to about 600° C. or 780° C., after completing the path portion indicated by arrows E, next passes over a further weir 30 into the zone B of the apparatus. Zone B comprises a chamber 32 in which are received two apertured parallel panels 34, 36 which divide the zone into three compartments 38, 40, 42. Each panel 34, 36 is provided with a plurality of apertures in the present example sixteen, in identical layouts, edges of corresponding apertures being joined together by four transverse rows of tubular conduits 44 to form a heat exchanger unit (FIG. 3). Baffle plates 46, 48, 50 are welded to the conduits 44 and baffle plate 52 is welded to plate 48 and to plate 34. Barrier plates 54 and 56 extend transversely of the upper parallel panel 34.

After passing over the weir 30, the sand entering the compartment 38 continues its serpentine path by following a path portion downwardly through the four conduits 44 in the first row of conduits adjacent the weir 30, to enter a first of two sub-chambers comprising compartment 42 (see arrows F). Each sub-chamber contains a fluidising arrangement of perforated air-supply pipes 58.

The sand then travels upwardly through the second row of conduits (arrows G) and into the compartment 38 before descending the third row of conduits 44 (arrows H) into the second of the two sub-chambers of the compartment 42. The sand then rises through the final row of conduits 44 (arrows J) back into the compartment 38 to leave the zone B by way of outlet 60.

By the time the sand is discharged at the outlet 60 the temperature thereof has been reduced to approximately 250° C. by the action of cooling air in zone B. Air is supplied to the zone B not only through pipes 62 which supply the perforated air-supply pipes 58 in compartment 42, but also through a pipe 64 to act as a cooling medium flowing around the sand-containing conduits 44. The path of the air around baffles 50, 48 and 46, is shown in broken line by arrows K. This air is thus travelling through the zone B in the opposite direction to that of the sand.

The air, which entered the zone B through pipe 64 at a temperature of approximately 30° C. leaves the zone at a position shown diagrammatically at 66 at a temperature of approximately 300° C. and is fed through a pipe 68 to the inlets 16 of zone A whence it is used to comprise or augment air used as the fluidising medium for the sand being treated in that zone.

Sand discharged from the apparatus may conveniently be further treated in a conventional cooling and classifying apparatus before it is re-used in the foundry or other industrial use.

It will be appreciated that in many industrial uses, sand will contain a quantity of combustible material. When the present invention is applied to the reclamation of such sands, an exothermic reaction will occur upon heating. This may result in sufficient heat being released for the operation of the heating devices 4 to be unnecessary since the sand is sufficiently heated during its serpentine flow path through zone A of the apparatus as described above. It will be appreciated that it is within the scope of the invention to add combustible material if desired, in the form of solid fuel or to coat the sand with liquid fuel.

In certain circumstances, excess heat may be generated in zone A and thus may readily be controlled by the supply of additional fluidising air. Otherwise, in circumstances where fuel is added, it is advantageous to keep the amount of fluidising air to a minimum to reduce heat losses in the flue gases. These flue gases may be kept to a minimum volume by the addition of oxygen to the fluidising air fed to zone A where this is beneficial.

Flue gases bearing zone A at a typical figure of 580° C. also receives fluidising air from the sand in zone B at, say, 250° C. and are drawn off. However, to avoid leakage of any products of combustion from zones A and B, where there may be conditions of partial vacuum adjacent the sand outlet 60 from zone B due to the operation for example of the cooling and classifying apparatus, care must therefore be taken to prevent flue gas being sucked into the sand outlet and for this purpose, it will be observed that the baffle plate 56 is provided with an extension portion 70 which acts as a barrier ensuring that the products of combustion are segregated from the treated sand.

Various modifications may be made within the scope of the invention as defined in the following claims.

We claim:

1. A method of thermally reclaiming contaminated industrial sand, said method comprising the step of fluidizing the sand to be reclaimed, in a first stage forcing the fluidized sand to follow a first flow path having upwardly and downwardly directed portions utilizing upright weirs and baffles while electrically heating the fluidized sand to a temperature whereat the contaminates are removed, and in a second stage passing the hot sand along a second flow path having second upwardly and downwardly directed portions defined by passageways around which a cooling medium flows in heat transfer relation to cool the treated sand, the cooling medium being heated by the hot sand and being utilized to effect heating of the contaminated sand in the first flow path.

2. A method according to claim 1 wherein the cooling medium is air.

3. A method as claimed in claim 2, wherein said passageways are defined by tubular conduits, said air passing through spaces formed between adjacent conduits.

4. A method as claimed in claim 1 in which the electrical heating of the sand is effected by electrical heaters positioned in the first flow path to supply heat to the sand.

5. A method as claimed in claim 1, wherein the flow path portions of the first flow path are arranged to provide a serpentine flow path.

6. A method according to claim 1 wherein said weirs and baffles are disposed in a chamber having a sand inlet at one end thereof, said chamber including a base plate having at least one of the weirs extending upwardly therefrom, and at least one of the baffles extending from a level above a normal level of fluidized sand in the chamber downwardly to a level spaced from the base plate.

7. A method according to claim 1 wherein typical temperatures of said method includes the temperature of the heated sand being on the order of 600° C. and above and the temperature of the heated cooling medium being on the order of 300° C.

8. Apparatus for carrying out a method of thermal reclamation of industrial sand, said apparatus comprising a first fluidizing zone comprising a chamber, a sand inlet at one end of said chamber, a base panel, at least one weir upstanding from said base panel of the chamber and at least one baffle arranged to extend from a level above the normal level of fluidized material in said chamber downwardly to a level spaced from said base panel and arranged in said path so as to define a first flow path portion between adjacent weirs and baffles, electrical heating means in said chamber to heat the sand to a temperature whereat the contaminates are removed, said apparatus further comprising a second fluidizing zone defined by passageways, means to supply cooling air around said passageways to reduce by heat exchange the temperature of sand entering said second zone and means to transfer air so heated to said first zone as fluidizing air.

9. Apparatus as claimed in claim 8, wherein said electrical heating means include a plurality of elongate heaters in the first fluidizing zone and arranged to extend transversely of the chamber in a staggered formation.

* * * * *